United States Patent
Wei et al.

(10) Patent No.: US 10,859,891 B2
(45) Date of Patent: Dec. 8, 2020

(54) PROJECTION DEVICE AND IMAGING MODULE THEREOF

(71) Applicant: Coretronic Corporation, Hsin-Chu (TW)

(72) Inventors: Chung-Ting Wei, Hsin-Chu (TW); Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/402,185

(22) Filed: May 2, 2019

(65) Prior Publication Data
US 2020/0004108 A1 Jan. 2, 2020

(30) Foreign Application Priority Data
Jun. 29, 2018 (CN) .................... 2018 2 1016359 U

(51) Int. Cl.
| | |
|---|---|
| *G03B 5/08* | (2006.01) |
| *G03B 21/14* | (2006.01) |
| *G03B 21/28* | (2006.01) |
| *G09G 3/00* | (2006.01) |
| *G03B 21/00* | (2006.01) |

(52) U.S. Cl.
CPC ............. *G03B 5/08* (2013.01); *G03B 21/145* (2013.01); *G03B 21/28* (2013.01); *G09G 3/007* (2013.01); *G03B 21/006* (2013.01); *G03B 21/008* (2013.01); *G03B 2205/00* (2013.01); *G03B 2205/0061* (2013.01); *G03B 2205/0069* (2013.01)

(58) Field of Classification Search
CPC ...... G03B 21/00–64; H04N 9/31–3197; G02B 26/00–129; G02B 7/00–40; G09G 3/007
See application file for complete search history.

(56) References Cited

U.S. PATENT DOCUMENTS

| | | | | |
|---|---|---|---|---|
| 2008/0151356 A1* | 6/2008 | Fujita | .................... | G09G 3/007 359/298 |
| 2016/0216599 A1* | 7/2016 | Chien | ................. | G03B 21/2066 |
| 2016/0227177 A1* | 8/2016 | Mizoguchi | ........... | G03B 21/142 |
| 2016/0370575 A1* | 12/2016 | Lin | .................... | G02B 26/0833 |
| 2017/0272717 A1* | 9/2017 | Nishizawa | ......... | G02B 26/0816 |
| 2018/0095269 A1* | 4/2018 | Mizoguchi | ......... | G02B 27/0101 |

FOREIGN PATENT DOCUMENTS

| | | |
|---|---|---|
| TW | I376564 B1 | 11/2012 |
| TW | 201723631 A | 7/2017 |
| TW | I631409 B | 8/2018 |

* cited by examiner

*Primary Examiner* — Christina A Riddle
*Assistant Examiner* — Christopher A Lamb, II

(57) ABSTRACT

An imaging module includes a display element, a prism and an image displacement device. The display element includes an active display surface. The prism includes an optical surface. The image displacement device is disposed between the display element and the prism. The image displacement device includes an optical element, a carrier, a base and at least one actuator. The optical element is disposed on the carrier. The at least one actuator drives the optical element on the carrier to swing relative to the base.

26 Claims, 6 Drawing Sheets

PROJECTION DEVICE AND IMAGING MODULE THEREOF

CROSS-REFERENCE TO RELATED APPLICATION

THIS APPLICATION CLAIMS THE PRIORITY BENEFIT OF CHINA APPLICATION CN201821016359.8 FILED ON Jun. 29, 2018. THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a projection device and an imaging module thereof, and more particularly to a projection device with an image displacement device and an imaging module thereof.

BACKGROUND OF THE INVENTION

The projection device is a device that projects an image onto a projection screen for the user to watch. When the resolution of the image projected by the projection device is increased, the image displayed on the projection screen will have a finer image quality. In addition to the common 1080P (1920×1080 pixels) image, images of 4K (3840×2160 pixels) image or more have become more popular in recent years. Therefore, every manufacturer is working hard to improve the resolution of the projection device.

Generally, larger high-resolution imaging components (such as LCD, DMD, LCoS, etc.) are used, or additional components are added to increase the resolution of the projection device. However, these technical methods will make the size of the projection device larger, and the associated optical or mechanical components must also become larger, resulting in the increase in cost and volume. Therefore, how to reduce the size of the projection device when improving the resolution of the projection device is the focus of attention of the relevant personnel in the field.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

An objective of the invention is to provide an imaging module, which can reduce the size of the projection device applied with the imaging module.

Another objective of the invention is to provide a projection device, which can reduce the size of the projection device.

Other objectives and advantages of the invention may be further illustrated by the technical features disclosed in the invention.

In order to achieve one or a portion of or all of the objectives or other objectives, an embodiment of the invention provides a projection device, including a display element, a prism and an image displacement device. The display element includes an active display surface. The prism includes an optical surface. The image displacement device is disposed between the display element and the prism. The image displacement device includes an optical element, a carrier, a base and at least one actuator. The optical element is disposed on the carrier. The at least one actuator is disposed on the base, and one end of the at least one actuator is connected to the carrier to drive the optical element on the carrier to swing relative to the base. The distance from the active display surface to the optical element is a first distance. The line located in the normal of the center of the active display surface is a reference line. In the line segment of the orthographic projection of the at least one actuator on the reference line, one end point adjacent to the display element is a reference point. The distance from the reference point to the optical element is a second distance. The distance between the edge of the carrier near the prism and the optical element is a spacing distance. The first distance is less than the second distance and the second distance is greater than the spacing distance.

In order to achieve one or a portion of or all of the objectives or other objectives, another embodiment of the invention provides a projection device, including a lighting system, an imaging module, and a projection lens. The lighting system is used to provide a lighting beam. The imaging module includes a display element, a prism, and an image displacement device. The display element includes an active display surface. The prism includes an optical surface. The image displacement device is disposed between the display element and the prism. The image displacement device includes an optical element, a carrier, a base and at least one actuator. The optical element is disposed on the carrier. The at least one actuator is disposed on the base, and one end of the at least one actuator is connected to the carrier to drive the optical element on the carrier to swing relative to the base. The distance from the active display surface to the optical element is a first distance. The line located in the normal of the center of the active display surface is a reference line. In the line segment of the orthographic projection of the at least one actuator on the reference line, an end point adjacent to the display element is a reference point. The distance from the reference point to the optical element is a second distance, and the distance between the edge of the carrier near the prism and the optical element is a spacing distance. The first distance is less than the second distance and the second distance is greater than the spacing distance.

The imaging module of the embodiment of the invention can greatly reduce the distance from the projection lens to the prism and/or reduce the distance from the prism to the image displacement device, so that the back focal length of the projection device applied with the imaging module can be greatly reduced. The size of the projection device and the cost can be reduced, and the optical quality of the projection device can also be improved.

Other objectives, features and advantages of The invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
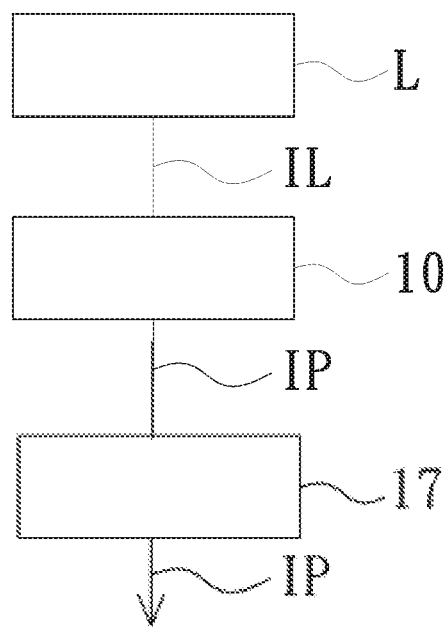
FIG. 1 shows a schematic diagram of a projection device according to an embodiment of the invention.

FIG. 1 shows a schematic diagram of a projection device according to an embodiment of the invention. Referring to FIG. 1, the projection device 1 includes a lighting system L and an imaging module 10. The imaging module 10 is disposed on the transmission path of the lighting beam IL provided by the lighting system L for converting the lighting beam IL into an image beam IP, and the image beam IP is projected on the projection surface (projection screen or wall) by the projection lens 17 to form an image. The lighting system L may include, for example, a high pressure mercury-vapor lamp, a laser diode, or a light emitting diode to generate the lighting beam IL, to which the invention is not limited.

Figure 2A:
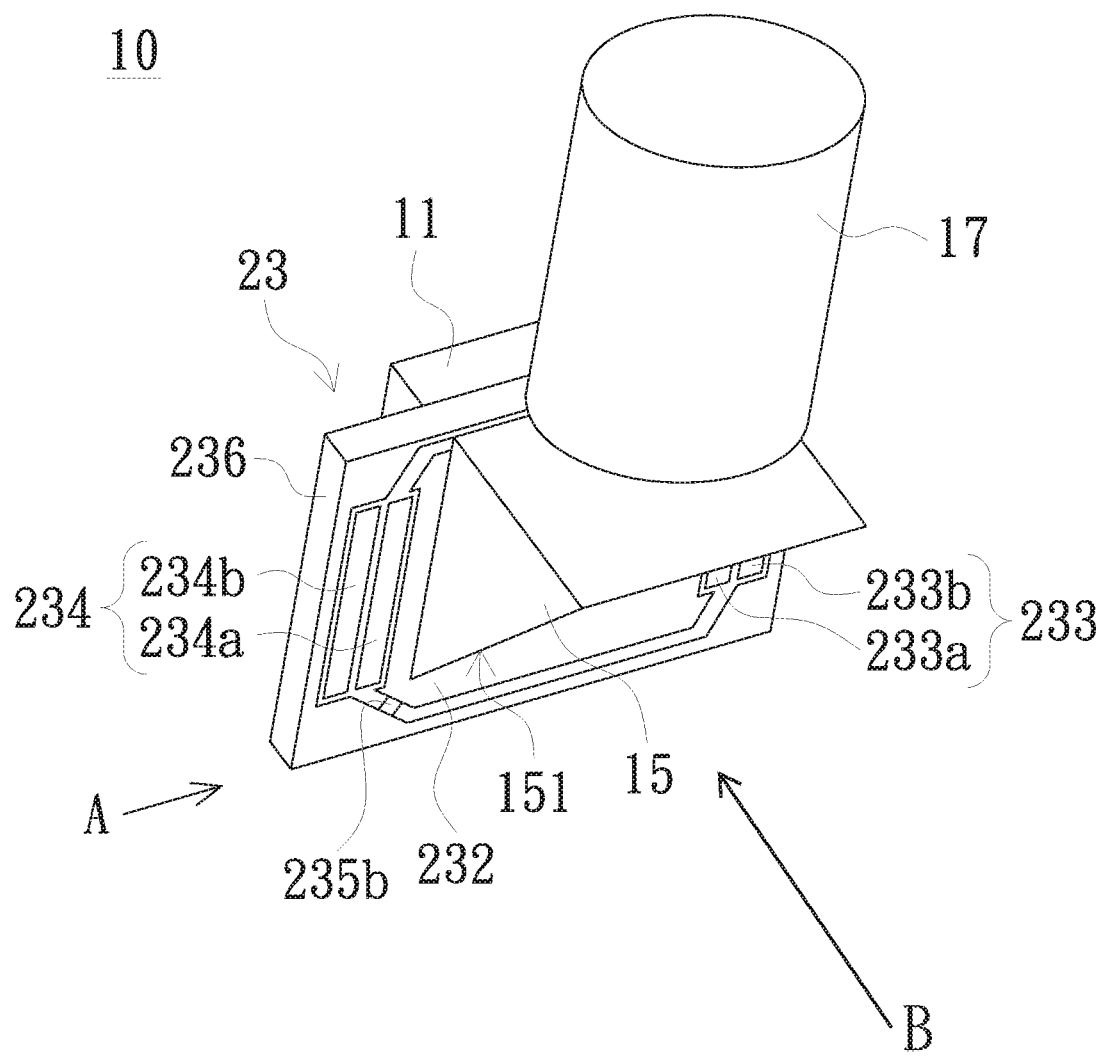
FIG. 2A to FIG. 2D show a schematic diagram of an imaging module according to an embodiment of the invention.
Figure 2B:
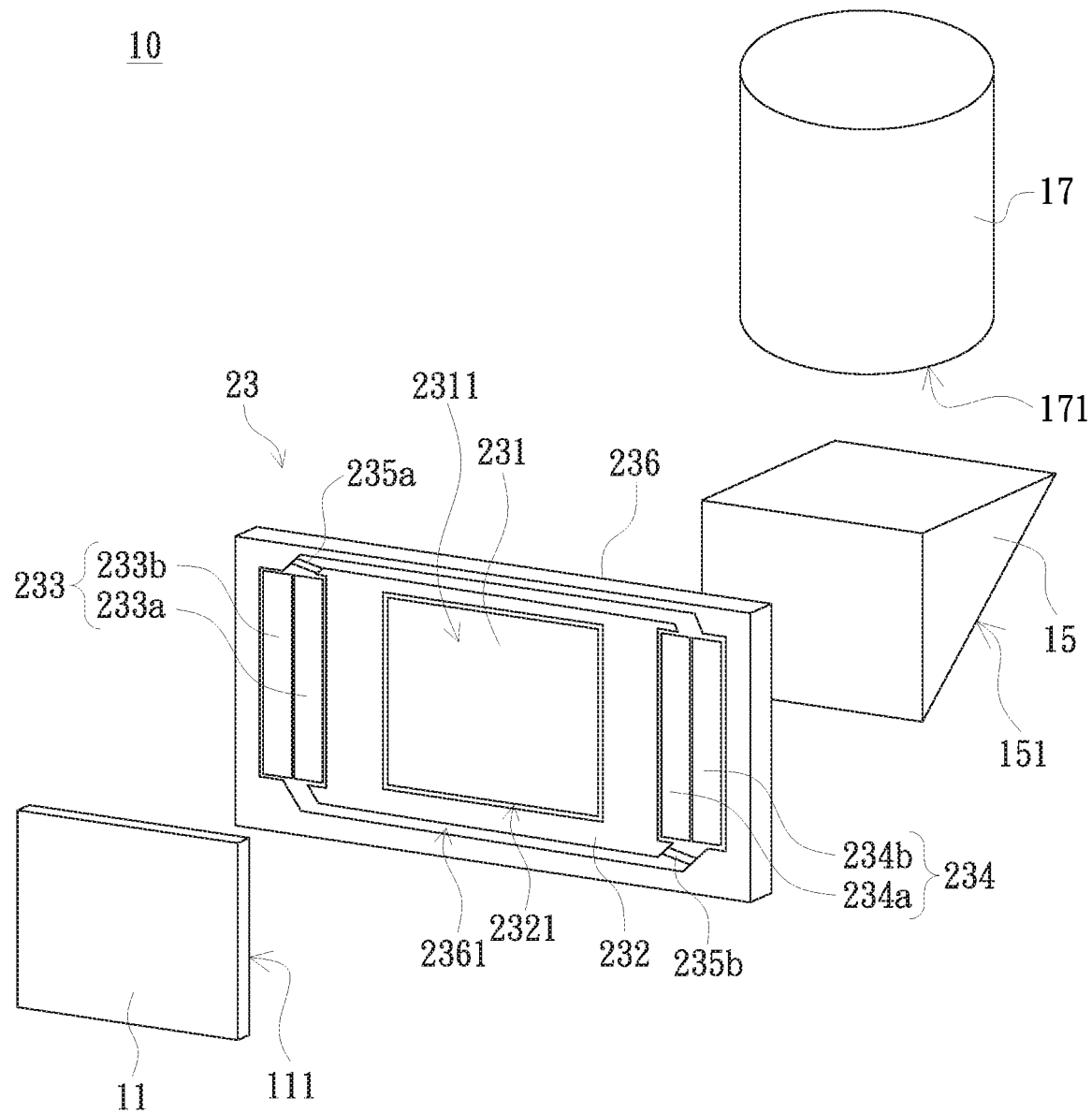
Figure 2C:
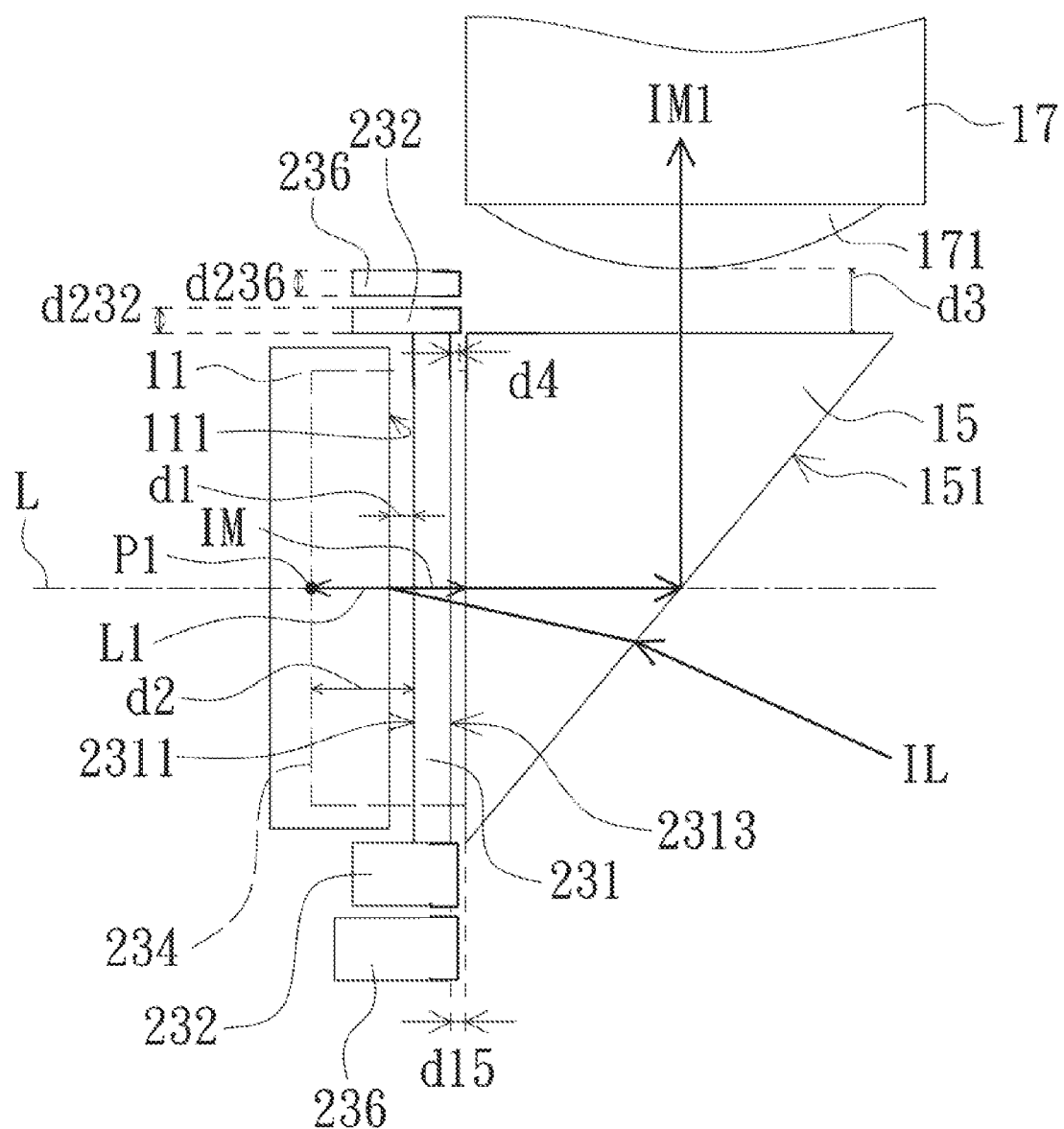
Figure 2D:
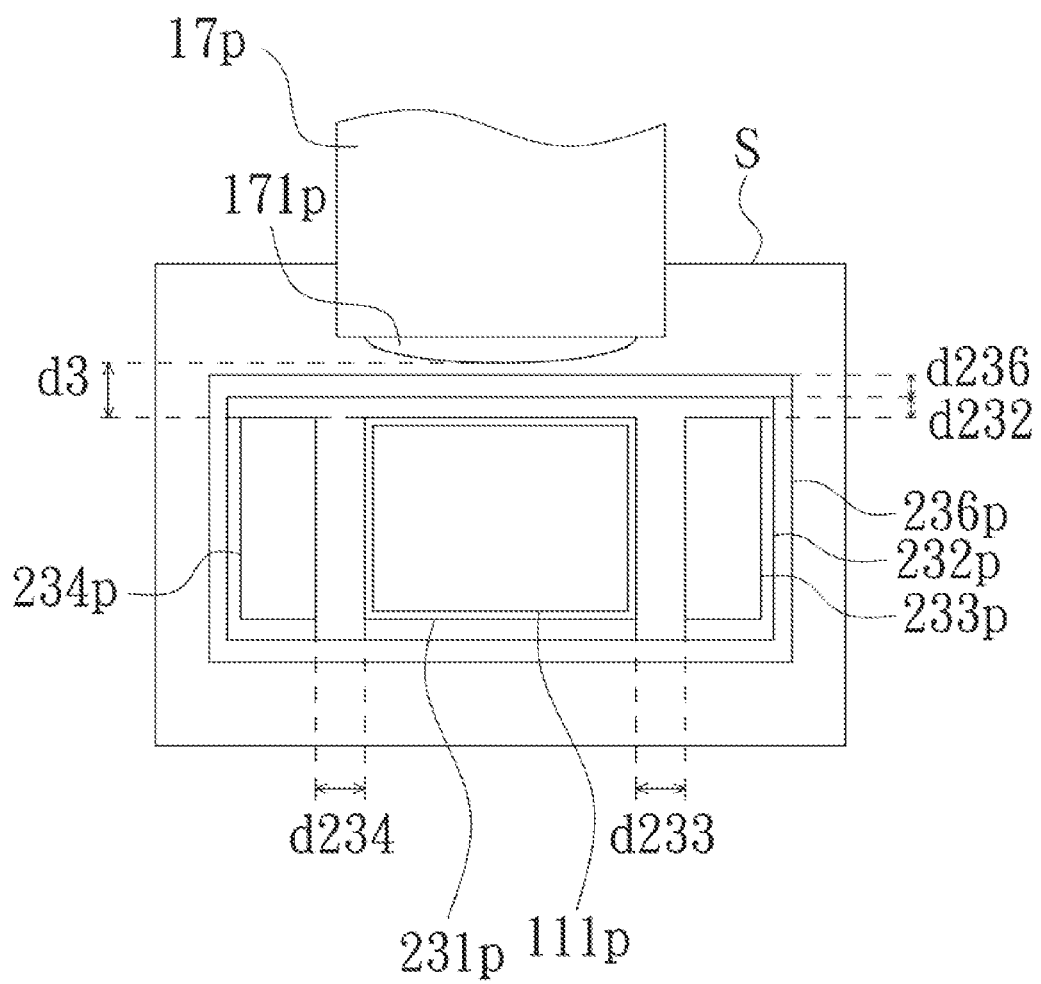

Also referring to FIG. 2A to FIG. 2D, FIG. 2A to FIG. 2D show the schematic diagram of the imaging module 10 shown in FIG. 1, wherein FIG. 2A is a three-dimensional diagram of the imaging module 10, FIG. 2B is an exploded view of the imaging module 10, FIG. 2C is a sectional view of the imaging module 10, and FIG. 2D is a schematic diagram of relative positions of some components of the imaging module 10 shown in FIG. 2A. As shown in FIG. 2A, the imaging module 10 of the embodiment includes a display element 11, an image displacement device 23, a prism 15, and a projection lens 17.

FIG. 2B is a schematic view showing the display element 11, the image displacement device 23, the prism 15 and the projection lens 17 of the imaging module 10 separated to facilitate the description of the structure of each element. As shown in FIG. 2B, the display element 11 includes an active display surface 111, wherein the active display surface 111 faces the image displacement device 23 and the prism 15. The prism 15 includes an optical surface 151. The image displacement device 23 is disposed between the display element 11 and the prism 15. In the embodiment, the projection lens 17 is disposed above the prism 15, wherein the projection lens 17 faces the optical surface 151 of the prism 15. The image displacement device 23 includes an optical element 231, a carrier 232, a base 236 and actuators 233, 234. The optical element 231 is disposed on the carrier 232. The actuators 233, 234 are disposed on the base 236. One end of the actuators 233, 234 is connected to the carrier 231 to drive the optical element 231 on the carrier 232 to swing relative to the base 236, wherein the base 236 is fixed in the projection device 1.

FIG. 2C is a sectional view of the imaging module 10 shown in FIG. 2A as viewed from the A direction. As shown in FIG. 2C, the lighting beam IL provided by the lighting system L can be incident to the prism 15 via the optical surface 151 of the prism 15, and the incident lighting beam IL can be refracted by the prism 15 to the optical element 231. The lighting beam IL then passes through the optical element 231 and is incident to the display element 11. The active display surface 111 of the display element 11 receives the lighting beam IL and converts the lighting beam IL into the image beam IP and reflects the image beam IP to the optical element 231. Then the image beam IP passes through the optical element 231. The image beam IP is incident to the optical surface 151 of the prism 15, and the incident angle of the image beam IP exceeds the critical angle of the prism 15, so that the image beam IP is reflected by the optical surface 151 to the projection lens 17. Since the actuators 233, 234 can drive the optical element 231 on the carrier 232 to swing relative to the base 236, the optical element 231 can thus change the image characteristics of the image beam IP, that is, to change the light path of the image beam IP. Therefore, by the setting of the image displacement device 23, for example, the image resolution of the projection device 1 or the image quality of the projected image can be improved, to which the invention is not limited.

When the optical surface 151 of the prism 15 reflects the image beam IP to the projection lens 17, the image beam IP, for example, is totally reflected by the optical surface 151 of the prism 15. However, it is not excluded that the optical surface 151 can be coated, for example, with a transflective coating, so that the image beam IP can be projected to the projection lens 17.

In addition, in order to reduce the size of the imaging module 10, the prism 15 is disposed as close as possible to the image displacement device 23, that is, the distance d15 of the prism 15 to the image displacement device 23 is shortened as much as possible to shorten the back focal length of the projection device 1 (ie, the optical path distance from the active display surface 111 to the projection lens 17). In detail, shortening the back focal length can use a smaller projection lens 17 (the projection lens can use a lens with a smaller effective light diameter). In this embodiment, when the prism 15 is close to the image displacement device 23, the projection lens 17 will not block or mechanically interfere with the actuators 233, 234, the carrier 232 and/or the base 236 of the image displacement device 23, and the back focal length of the projection device 1 can be shortened.

FIG. 2D is a sectional view of the imaging module 10 shown in FIG. 2A as viewed from the B direction, wherein the A direction and the B direction are perpendicular to each other. As shown in FIG. 2D, ignoring the prism 15, the plane where the active display surface 111 of the display element 11 is located is a reference plane S. The orthographic projection of the active display surface 111 on the reference plane S is the active display surface area 111p, the orthographic projection of the optical element 231 on the reference plane S is the optical element area 231p, the orthographic projection of the actuator 233 on the reference plane S is the actuator area 233p, the orthographic projection of the actuator 234 on the reference plane S is the actuator area 234p, and the orthographic projection of the projection lens 17 on the reference plane S is the projection lens area 17p. In the embodiment, by setting the position of the actuators 233, 234, the actuator areas 233p, 234p of the orthographic projection of the actuators 233, 234 on the reference plane S do not overlap with the projection lens area 17p of the orthographic projection of the projection lens 17 on the reference plane S, wherein the so-called overlap includes partial overlap. It is worth mentioning that, regardless of whether the actuators 233, 234 of the imaging module 10 are disposed on either side of the optical element 231, the actuator areas 233p, 234p of the orthographic projection of the actuators 233, 234 on the reference plane S do not overlap with the projection lens area 17p of the orthographic projection of the projection lens 17 on the reference plane S. Referring again to FIG. 2C, the distance from the projection lens 17 to the prism 15 is the third distance d3. Since the actuator areas 233p, 234p of the orthographic projection of the actuators 233, 234 on the reference plane S and the projection lens area 17p do not overlap each other, the projection lens 17 is not blocked or interfered by the actuator 233 or 234. Therefore, when the distance d15 between the prism 15 and the image displacement device 23 is small, the projection lens 17 of the embodiment still can approach the prism 15 as much as possible to greatly reduce the back focal length of the projection device 1. Therefore, the size of the projection device 1 and the cost can be reduced.

Incidentally, the projection lens 17, for example, may include a plurality of lenses, wherein the lens 171 is the lens of the projection lens 17 closest to the prism 15. The orthographic projection of the lens 171 on the reference plane S is the lens area 171p. By setting the position of the actuators 233, 234, the lens 171 can be as close as possible to the prism 15 to greatly reduce the back focal length of the projection device 1. The projection lens 17 is not blocked or mechanically interfered by the actuators 233 or 234.

The positions and numbers of the two actuators 233, 234 shown in FIG. 2A to FIG. 2C are merely an example, to which the invention is not limited. The image displacement device 23, for example, may include a single actuator or four actuators. As long as the actuator area of the orthographic projection of the actuator on the reference plane S and the projection lens area 17p of the orthographic projection of the projection lens 17 do not overlap each other is sufficient, so that the projection lens 17 can be as close as possible to the prism 15 without being blocked by the actuators 233 or 234. In addition, the actuators 233, 234, for example, could be the voice coil actuator (VCM) or the piezoelectric ceramic device, to which the invention is not limited. In the embodiment, the actuator 233, for example, includes a magnet 233a and a coil 233b. In the embodiment, the coil 233b is disposed on the base 236, and the magnet 233a is connected to the carrier 232 as an example. Therefore, the actuator 233 could drive the carrier 232 to swing while operating. In other embodiments of the invention, the magnet of the actuator may be disposed on the base 236, and the coil may be connected to the carrier 232, to which the invention is not limited. The actuator 234 includes a magnet 234a and a coil 234b, the effects and features of which are similar to those of the actuator 233, and details are not described again.

Specifically, the carrier 232 and the base 236, for example, may be connected to each other by the elastic members 235a and 235b. The elastic members 235a and 235b are used to fix the carrier 232 and the base 236. When the actuators 233, 234 drive the carrier 232 to swing relative to the base 236, the elastic members 235a and 235b can be correspondingly elastically shaft rotated. However, the invention does not limit the material, structure, setting position or number of the elastic members.

In addition, in FIG. 2D, the orthographic projection of the base 236 on the reference plane S is the base area 236p. In the embodiment, the base area 236p of the orthographic projection of the base 236 does not overlap with the projection lens area 17p of the orthographic projection of the projection lens 17 on the reference plane S. The lens 171 of the projection lens 17 of the embodiment is very close to the prism 15, and the projection lens 17 is not blocked or interfered by the base 236. The thickness of the base 236 and/or the carrier 232 on the side close to the projection lens 17, for example, can be made thin, so that the base area 236p of the orthographic projection of the base 236 and the projection lens area 17p of the orthographic projection of the projection lens 17 on the reference plane S do not overlap each other, and the projection lens 17 is not blocked or interfered by the base 236. That is, the thickness d236 of the base 236 on the side close to the projection lens 17 and the thickness d232 of the carrier 232 on the side close to the projection lens 17 can be made thin, so that the lens 171 can approach the prism 15 without being blocked by the base 236. The back focal length of the projection device 1 can be greatly reduced.

In other embodiments of the invention, the base area 236p of the orthographic projection of the base 236, for example, may be also adjacent to the projection lens area 17p of the orthographic projection of the projection lens 17.

In addition, the base 236 and/or the carrier 232 of the image displacement device 23, for example, may include the metal material (e.g. stainless steel). Since the metal material is harder and tough than materials such as plastic, the base 236 and/or the carrier 232 including the metal material can be made thin and maintain sufficient strength. In addition, since the material of the carrier 232 is stainless steel, the overall rigidity of the image displacement device 23 can be enhanced, and the size of the image displacement device 23 can be reduced without deformation and distortion. In other embodiments, the base 236 may be made of stainless steel. That is, the thickness d236 of the base 236 on the side close to the projection lens 17 and the thickness d232 of the carrier 232 on the side close to the projection lens 17 can be made very thin, so that the projection lens 17 can approach the prism 15 without being blocked by the base 236.

In detail, as shown in FIG. 2C, the distance from the active display surface 111 of the display element 11 to the optical element 231 is a first distance d1. The line where the normal of the center of the active display surface 111 is located is a reference line L. The orthographic projection of the actuators 233, 234 on the reference line L is the line segment L1, and one end point of the line segment L1 adjacent to the display element 11 and away from the optical element 231 is a reference point P1. The distance from the reference point P1 to the optical element 231 is a second distance d2. In addition, the distance between the edge of the carrier 232 near the prism 15 and the optical element 231 is a spacing distance d4. In the embodiment, the first distance d1 is less than the second distance d2 and the second distance d2 is greater than the spacing distance d4. As shown in FIG. 2D, through the design of the carrier 232, the distance from the actuator area 233p to the optical element area 231p is the length d233, and the distance from the actuator area 234p to the optical element area 231p is the length d234. The actuator areas 233p, 234p of the actuators 233, 234 are sufficiently distant from the optical element area 231p of the optical element 231, that is, the length d233 and the length d234 are long enough, so that the active display surface area 111p of the active display surface 111 does not overlap or contact with actuator areas 233p, 234p. As shown in FIG. 2C, the display element 11 can be as close as possible to the optical element 231 without being blocked or interfered by the actuator 233 or 234. Therefore, the back focal length of the projection device 1 can be greatly reduced. The smaller back focal length can reduce the size and cost of the projection device 1, and can also improve the optical quality of the projection device 1.

In addition, in the embodiment, the base area 236p of the orthographic projection of the base 236 on the reference plane S does not overlap with the active display surface 111, and the carrier area 232p of the orthographic projection of the carrier 232 on the reference plane S also does not overlap with the active display surface 111. Therefore, the display element 11 can be as close as possible to the optical element 231 without being blocked or interfered by the base 236 or carrier 232.

The length d233 and the length d234 shown in FIG. 2D are only an example, to which the invention is not limited. As long as the lengths d233 and d234 could let the actuator areas 233p, 234p of the orthographic projection of the actuators 233, 234 on the reference plane S not overlap with the active display surface area 111p of the active display surface 111 is sufficient.

In detail, the optical element 231 includes a sheet glass, the sheet glass includes a light incident surface 2311 and a light exit surface 2313, and the light incident surface 2311 is opposite to the light exit surface 2313. The image beam IP is incident to the optical element 231 from the light incident surface 2311, and the lighting beam IL is incident to the optical element 231 from the light exit surface 2313. When the actuators 233, 234 do not drive the optical element 231 on the carrier 232 to swing relative to the base 236, the light incident surface 2311 and the light exit surface 2313 are parallel to the active display surface 111. When the actuators 233, 234 drive the optical element 231 on the carrier 232 to swing relative to the base 236, the light incident surface 2311 and the light exit surface 2313 are not parallel to the active display surface 111. Therefore, the actuators 233, 234 drive the optical element 231 to swing relative to the base 236, and the optical element 231 can change the image characteristics of the image beam IP. For example, the image resolution of the projection device 1 or the image quality of the projected image can be improved, to which the invention is not limited.

Specifically, as shown in FIG. 2B, the carrier 232 includes a first hollow region 2321, and the optical element 231 is disposed in the first hollow region 2321. The base 236 includes a second hollow region 2361, and the carrier 232 is located in the second hollow region 2361. The structure and shape of the carrier 232 and the base 236 shown in FIG. 2A and FIG. 2B are only an example, to which the invention is not limited.

Incidentally, the light incident surface 2311 of the optical element 231 and the active display surface 111 of the display element 11 may be, for example, rectangular. As shown in FIG. 2D, in the embodiment, the area of the light incident surface 2311 of the optical element 231 is larger than the area of the active display surface 111. Therefore, through the design of the carrier 232, the length d233 and the length d234 are long enough, so that the actuators 233, 234 are sufficiently distant from the optical element 231, so that the active display surface 111 does not contact with the actuators 233, 234. Without increasing the area of the optical element 231, the display element 11 can be as close as possible to the optical element 231 without being blocked by the actuators 233 or 234. Therefore, the back focal length of the projection device 1 can be greatly reduced without increasing the cost of the optical components.

In the embodiment of the invention, the area of the light incident surface 2311, for example, is larger than the area of the active display surface 111.

Figure 3:
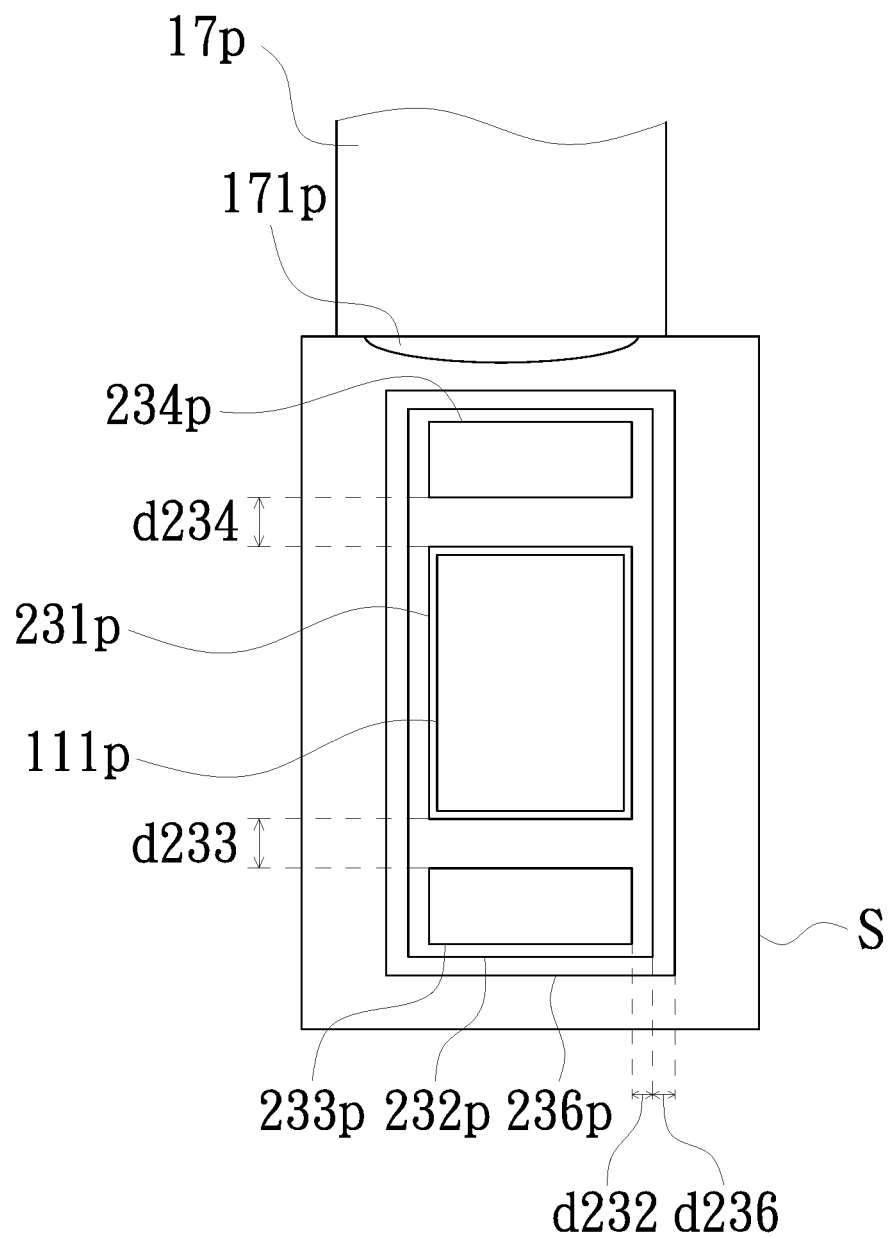
FIG. 3 shows a schematic diagram of relative positions of some components of an imaging module according to another embodiment of the invention.

FIG. 3 shows a schematic diagram of relative positions of some components of an imaging module according to another embodiment of the invention. Referring to FIG. 3, the imaging module of the embodiment has the similar structure and function as the imaging module shown in FIG. 2A to FIG. 2D, and has the same components. The technical feature difference is that the actuators 233, 234 of the embodiment are disposed on the upper and lower sides of the optical element 231. Actuators 233, 234 are shown in FIG. 3, through the design of the carrier 232, the distance from the actuator area 233p to the optical element area 231p is the length d233, and the distance from the actuator area 234p to the optical element area 231p is the length d234. The actuator areas 233p, 234p of the actuators 233, 234 are sufficiently distant from the optical element area 231p of the optical element 231, that is, the length d233 and the length d234 are long enough, so that the active display surface area 111p of the active display surface 111 does not overlap or contact with actuator areas 233p, 234p. The display element 11 can be as close as possible to the optical element 231 without being blocked or interfered by the actuator 233 or 234. In addition, the projection lens area 17p of the orthographic projection of the projection lens 17 on the reference plane S does not overlap with the actuator areas 233p, 234p of the actuators 233, 234. That is, the projection lens 17 can be close to the image displacement device 23, and the projection lens 17 and the actuators 233, 234 of the image displacement device 23 do not contact and mechanical interfere. Therefore, the back focal length of the projection device 1 can be greatly reduced. The smaller back focal length can reduce the size and cost of the projection device 1, and can also improve the optical quality of the projection device 1.

In addition, the display element 11 of the projection device 1, for example, may be a digital micromirror device (DMD) or a liquid crystal on silicon (LCoS) device. In addition, the active display surface 111 of the display element 11 refers to a surface on which the light beam modulation is generated by driving the display element 11 by the electrical signal, and the active display surface 111 could convert the lighting beam IL into the image beam IP, to which the invention is not limited.

In summary, the imaging module of the embodiment of the invention can greatly reduce the distance from the projection lens to the prism and/or reduce the distance from the prism to the image displacement device, so that the back focal length of the projection device applied with the imaging module can be greatly reduced. The size of the projection device and the cost can be reduced, and the optical quality of the projection device can also be improved. In addition, in order to avoid the problem of mechanism interference when the display element is closer to the optical element of the image displacement device, the imaging module of the invention moves at least one actuator away from the optical element without changing the size of the conventional optical element. In other embodiments, multiple actuators can be moved outwardly to the sides (e.g. four sides) of the optical element.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as first distance, second distance, third distance, first hollow region, and second hollow region are only used for distinguishing various elements and do not limit the number of the elements.

What is claimed is:

1. An imaging module, comprising:
   a display element, comprising an active display surface;
   a prism, comprising an optical surface; and
   an image displacement device, disposed between the display element and the prism, wherein the image displacement device comprises:
   an optical element;
   a carrier;
   a base; and
   at least one actuator, wherein the optical element is disposed on the carrier, the at least one actuator is disposed on the base, and one end of the at least one actuator is connected to the carrier to drive the optical element on the carrier to swing relative to the base, wherein a distance from the active display surface to the optical element is a first distance, a line located in the normal of a center of the active display surface is a reference line, in a line segment of the orthographic projection of the at least one actuator on the reference line, one end point adjacent to the display element is a reference point representing one end point of the at least one actuator, a distance from the reference point to the optical element is a second distance, a distance between the edge of the carrier near the prism and the optical element is a spacing distance, and the first distance is less than the second distance and the second distance is greater than the spacing distance.

2. The imaging module of claim 1, wherein a lighting beam is incident to the prism through the optical surface, and then projected by the prism to the optical element, and then the lighting beam passes through the optical element and is incident to the display element, the active display surface receives the lighting beam and converts the lighting beam into an image beam and reflects the image beam to the optical element, and then the image beam passes through the optical element and is incident to the optical surface of the prism and is reflected by the optical surface to a projection lens.

3. The imaging module of claim 2, wherein the plane located in the active display surface is a reference plane, and the area of the orthographic projection of the at least one actuator on the reference plane does not overlap with the area of the orthographic projection of the projection lens on the reference plane.

4. The imaging module of claim 3, wherein the area of the orthographic projection of the base on the reference plane does not overlap with the area of the orthographic projection of the projection lens on the reference plane.

5. The imaging module of claim 2, wherein the optical element comprises a sheet glass, the sheet glass comprises a light incident surface and a light exit surface, the light incident surface is opposite to the light exit surface, the image beam is incident to the optical element from the light incident surface, when the at least one actuator does not drive the optical element on the carrier to swing relative to the base, the light incident surface and the light exit surface are parallel to the active display surface, and when the at least one actuator drives the optical element on the carrier to swing relative to the base, the light incident surface and the light exit surface are not parallel to the active display surface.

6. The imaging module of claim 5, wherein the light incident surface and the active display surface are rectangular.

7. The imaging module of claim 6, wherein the area of the light incident surface is larger than the area of the active display surface.

8. The imaging module of claim 1, wherein the base and/or the carrier of the image displacement device comprises a stainless steel material.

9. The imaging module of claim 1, wherein the plane located in the active display surface is a reference plane, and the area of the orthographic projection of the base and the at least one actuator on the reference plane does not overlap with the area of the orthographic projection of the active display surface on the reference plane.

10. The imaging module of claim 1, wherein the carrier comprises a first hollow region, the optical element is disposed in the first hollow region, the base comprises a second hollow region, and the carrier is located in the second hollow region.

11. The imaging module of claim 1, wherein the at least one actuator is a voice coil actuator or a piezoelectric ceramic device.

12. The imaging module of claim 1, wherein the at least one actuator comprises a magnet and a coil, wherein the magnet is disposed on the base, the coil is connected to the carrier; or the coil is disposed on the base, the magnet is connected to the carrier.

13. The imaging module of claim 1, wherein the display element is a digital micromirror device (DMD) or a liquid crystal on silicon (LCoS) device.

14. A projection device, comprising:
a lighting system, adapted to provide a lighting beam;
an imaging module, comprising:
a display element;
a prism; and
an image displacement device, wherein the display element comprises an active display surface, the prism comprises an optical surface, and the image displacement device is disposed between the display element and the prism, the image displacement device comprises:
an optical element;
a carrier;
a base; and
at least one actuator, wherein the optical element is disposed on the carrier, the at least one actuator is disposed on the base, and one end of the at least one actuator is connected to the carrier to drive the optical element on the carrier to swing relative to the base, and
wherein a distance from the active display surface to the optical element is a first distance, a line located in the normal of the center of the active display surface is a reference line, in a line segment of the orthographic projection of the at least one actuator on the reference line, an end point adjacent to the display element is a reference point representing one end point of the at least one actuator, a distance from the reference point to the optical element is a second distance, and a distance between the edge of the carrier near the prism and the optical element is a spacing distance, the first distance is less than the second distance and the second distance is greater than the spacing distance.

15. The projection device of claim 14, wherein an lighting beam is incident to the prism through the optical surface, and then projected by the prism to the optical element, and then the lighting beam passes through the optical element and is incident to the display element, the active display surface receives the lighting beam and converts the lighting beam into an image beam and reflects the image beam to the optical element, and then the image beam passes through the optical element and is incident to the optical surface of the prism and is reflected by the optical surface to a projection lens.

16. The projection device of claim 15, wherein the optical element comprises a sheet glass, the sheet glass comprises a light incident surface and a light exit surface, the light incident surface is opposite to the light exit surface, the image beam is incident to the optical element from the light incident surface, when the at least one actuator does not drive the optical element on the carrier to swing relative to the base, the light incident surface and the light exit surface are parallel to the active display surface, and when the at least one actuator drives the optical element on the carrier to swing relative to the base, the light incident surface and the light exit surface are not parallel to the active display surface.

17. The projection device of claim 16, wherein the light incident surface and the active display surface are rectangular.

18. The projection device of claim 17, wherein the area of the light incident surface is larger than the area of the active display surface.

19. The projection device of claim 14, wherein the plane located in the active display surface is a reference plane, and the area of the orthographic projection of the at least one actuator on the reference plane does not overlap with the area of the orthographic projection of the projection lens on the reference plane.

20. The projection device of claim 19, wherein the area of the orthographic projection of the base on the reference plane does not overlap with the area of the orthographic projection of the projection lens on the reference plane.

21. The projection device of claim 14, wherein the base and/or the carrier of the image displacement device comprise a stainless steel material.

22. The projection device of claim 14, wherein the plane located in the active display surface is a reference plane, and the area of the orthographic projection of the base and the at least one actuator on the reference plane does not overlap with the area of the orthographic projection of the active display surface on the reference plane.

23. The projection device of claim 14, wherein the carrier comprises a first hollow region, the optical element is disposed in the first hollow region, the base comprises a second hollow region, and the carrier is located in the second hollow region.

24. The projection device of claim 14, wherein the at least one actuator is a voice coil actuator or a piezoelectric ceramic device.

25. The projection device of claim 14, wherein the at least one actuator comprises a magnet and a coil, wherein the magnet is disposed on the base, the coil is connected to the carrier; or the coil is disposed on the base, the magnet is connected to the carrier.

26. The projection device of claim 14, wherein the display element is a digital micromirror device (DMD) or a liquid crystal on silicon (LCoS) device.

* * * * *